United States Patent
Zhang et al.

(10) Patent No.: US 9,936,459 B2
(45) Date of Patent: Apr. 3, 2018

(54) DATA RELAY BETWEEN COMMUNICATION DEVICES

(71) Applicants: EMPIRE TECHNOLOGY DEVELOPMENT LLC, Wilmington, DE (US); Junhua Zhang, Beijing (CN); Qi Li, Beijing (CN); Xuefeng Song, Hebei (CN)

(72) Inventors: Junhua Zhang, Beijing (CN); Qi Li, Beijing (CN); Xuefeng Song, Hebei (CN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 215 days.

(21) Appl. No.: 14/438,522

(22) PCT Filed: Aug. 9, 2013

(86) PCT No.: PCT/CN2013/081162
§ 371 (c)(1),
(2) Date: Apr. 24, 2015

(87) PCT Pub. No.: WO2015/018058
PCT Pub. Date: Feb. 12, 2015

(65) Prior Publication Data
US 2015/0295634 A1    Oct. 15, 2015

(51) Int. Cl.
*H04W 76/02* (2009.01)
*H04W 52/02* (2009.01)
(Continued)

(52) U.S. Cl.
CPC .......... *H04W 52/0267* (2013.01); *H04B 7/14* (2013.01); *H04W 4/008* (2013.01);
(Continued)

(58) Field of Classification Search
CPC ..... H04W 28/08; H04W 8/005; H04W 4/008; H04W 52/0261; H04W 76/022
See application file for complete search history.

(56) References Cited

U.S. PATENT DOCUMENTS 6,665,867 B1 * 12/2003 Ims .................. H04L 67/34
717/173
7,852,755 B2   12/2010 King
(Continued)

FOREIGN PATENT DOCUMENTS

CN   102714876 A   10/2012
EP   1819099 A1    8/2007
(Continued)

OTHER PUBLICATIONS

"Near field communication," accessed at https://web.archive.org/web/20130726030257/http://en.wikipedia.org/wiki/Near_field_communication, last modified on Jul. 21, 2013, pp. 13.
(Continued)

*Primary Examiner* — Omer S Mian
(74) *Attorney, Agent, or Firm* — Brundidge & Stanger, P.C.

(57) ABSTRACT

While a user utilizes a communication device to communicate with other devices over a network, certain technical issues may cause the interruption or disconnection of the communication. The communication device may be configured to relay the communication to a secondary device to continue the communication without interrupting the communication.

14 Claims, 4 Drawing Sheets

(51) Int. Cl.
*H04W 4/00* (2009.01)
*H04W 8/00* (2009.01)
*H04B 7/14* (2006.01)
*H04W 28/08* (2009.01)
*H04W 88/04* (2009.01)

(52) U.S. Cl.
CPC ........... *H04W 8/005* (2013.01); *H04W 28/08* (2013.01); *H04W 52/027* (2013.01); *H04W 76/022* (2013.01); *H04W 88/04* (2013.01)

(56) References Cited

U.S. PATENT DOCUMENTS

| | | | | |
|---|---|---|---|---|
| 8,626,936 | B2* | 1/2014 | Arendt | G06F 11/2023 709/223 |
| 2007/0013801 | A1* | 1/2007 | Sezan | H04N 1/00291 348/333.01 |
| 2007/0189257 | A1* | 8/2007 | Suzuki | H04W 88/04 370/338 |
| 2007/0248077 | A1* | 10/2007 | Mahle, Jr. | H04L 12/66 370/352 |
| 2011/0026701 | A1 | 2/2011 | Kirchhoff et al. | |
| 2012/0140017 | A1* | 6/2012 | Hong | H04N 7/144 348/14.1 |
| 2013/0254718 | A2* | 9/2013 | Kermoian | H04M 1/72597 715/841 |
| 2013/0295848 | A1* | 11/2013 | O'Neill | H04W 68/00 455/41.2 |
| 2014/0204834 | A1* | 7/2014 | Singh | H04W 40/22 370/315 |
| 2015/0045032 | A1* | 2/2015 | Tomici | H04W 36/04 455/436 |
| 2016/0027399 | A1* | 1/2016 | Wilde | G06F 13/382 345/520 |

FOREIGN PATENT DOCUMENTS

| | | |
|---|---|---|
| EP | 2395810 A1 | 12/2011 |
| WO | 2012069924 A1 | 5/2012 |

OTHER PUBLICATIONS

"Radio-frequency identification," accessed at https://web.archive.org/web/20131204011033/https://en.wikipedia.org/wiki/Radio-frequency_identification, last modified on Dec. 3, 2013, pp. 27.

"Wi-Fi," accessed at https://web.archive.org/web/20130801202816/http://en.wikipedia.org/wiki/Wi-Fi, last modified on Jul. 25, 2013, pp. 16.

International Search Report and Written Opinion from International Application No. PCT/CN13/081162 dated May 28, 2014.

* cited by examiner

DATA RELAY BETWEEN COMMUNICATION DEVICES

CROSS-REFERENCE TO RELATED APPLICATION

This Application is the U.S. National Stage filing under 35 U.S.C. § 371 of International Application No. PCT/CN2013/081162, filed on Aug. 9, 2013. The disclosure of the International Application is hereby incorporated herein by reference in its entirety.

TECHNICAL FIELD

The technologies described herein pertain generally to data relay between communication devices, one of which may be configured to communicate with other devices over a network.

BACKGROUND

Unless otherwise indicated herein, the approaches described in this section are not prior art to the claims in this application and are not admitted to be prior art by inclusion in this section.

While a user utilizes a communication device to communicate with other devices over a network, certain technical issues of the communication device, e.g., battery outage may cause the interruption or disconnection of the communication and may further worsen user experience.

SUMMARY

Technologies are generally described for accessing USB devices. The various techniques may be implemented in various systems, methods, and/or computer-readable mediums.

In some examples, various techniques may be implemented as devices. Some devices may include a load balancer, communicatively coupled to a first communication device, configured to transfer a communication data stream between a service provider and the first communication device to a second communication device, in accordance with at least one of a plurality of predetermined conditions regarding at least one of the device or the second communication device; and a storage unit configured to store identification information corresponding to the second communication device.

In some examples, various techniques may be implemented as methods. Some methods may include transmitting a communication data stream between a service provider and a first communication device; discovering one or more communication devices within a predetermined distance of a first communication device; determining that at least one of a plurality of predetermined conditions is met; and transferring the communication data stream to a second communication device, which is one of the discovered communication devices.

In some other examples, various techniques may be implemented as executable instructions stored on one or more computer-readable mediums. Some computer-readable mediums may store executable instructions that include determining at least one of a plurality of predetermined conditions is met, selecting a second communication device within a predetermined distance of a first communication device, and relaying a communication data stream between the first communication device and a calling party to the second communication device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
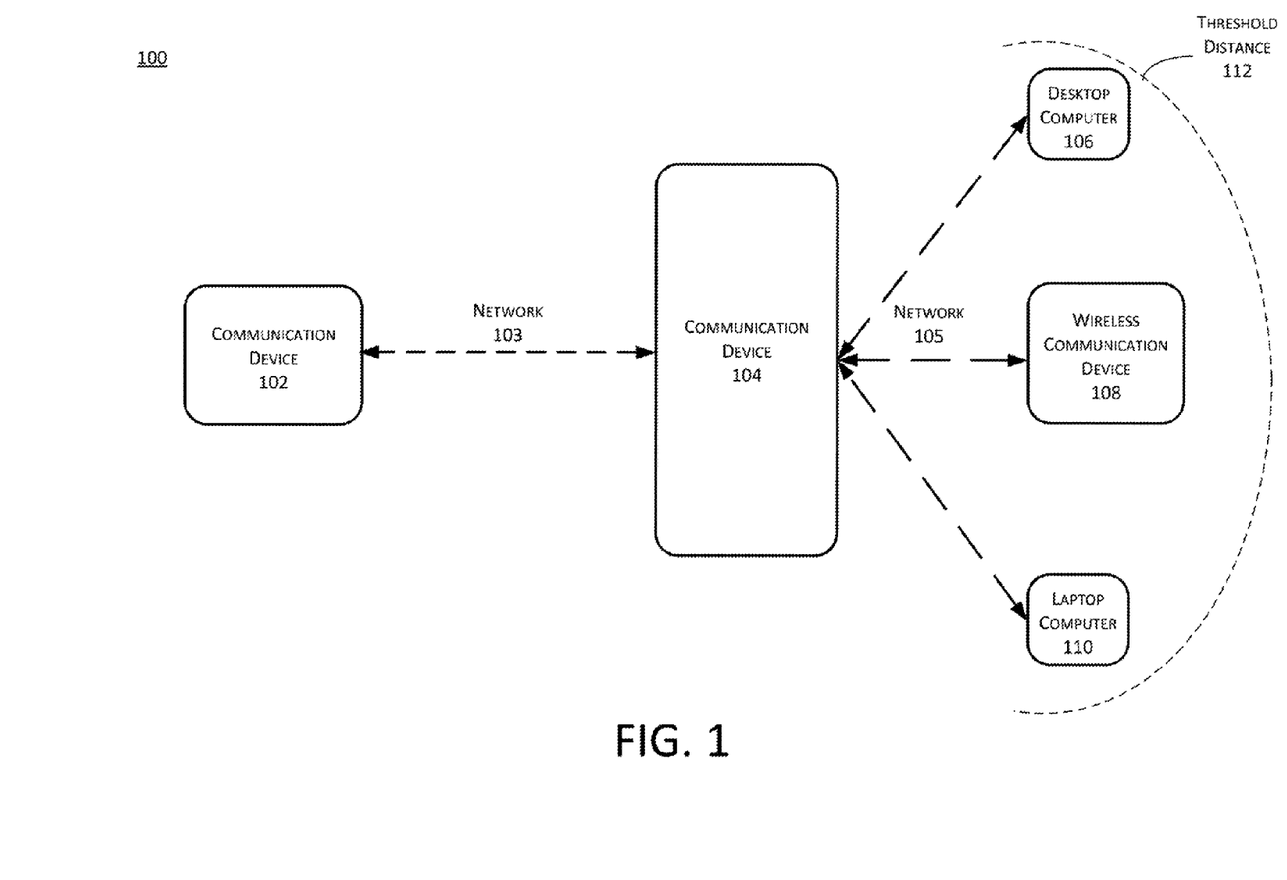
FIG. 1 shows an example system in which data relay between communication devices may be implemented, arranged in accordance with at least some embodiments described herein.

FIG. 1 shows an example system 100 in which data relay between communication devices may be implemented, arranged in accordance with at least some embodiments described herein. As depicted, example system 100 may include, at least, a communication device 102 that communicates, via a network 103, with a communication device 104 that may be configured to relay the communication to, via a network 105, other communication devices. The other communication devices may include a desktop computer 106, a wireless communication device 108, or a laptop computer 110, which may be located within a threshold distance 112 of communication device 104.

Communication device 102 may refer to a physical device that may be configured to exchange information with other communication devices via network 103. In accordance with some examples, communication device 102 may include telephones, cellphones, smart phones, personal digital assistant (PDA), or portable two-way radio transceivers. In accordance with other examples, communication devices 102 may include computing devices that may be configured to communicate with other wireless communication devices via the Internet. For example, the computing devices may include laptop computers, desktop computers, etc.

Network 103 may refer to a communication link that may be configured to support the information exchange between communication device 102 and communication device 104. In accordance with some examples, network 103 may refer to a cellular network that includes multiple cells and respective base stations. In other examples, network 103 may refer to the Internet that provides communication between multiple network terminals. One or more servers (not shown) may be configured to support the communication via the Internet. That is, a real time communication data stream may be established between communication device 102 and a service provider hosted on one of the multiple cells via network 103. Unexpected technical difficulties may cause interruptions or disconnections to the real time communication data stream and may further lower the user experience. For example, power outage on communication device 104 may cause a disconnection of the data stream.

Communication device 104 may refer to a physical device that may be configured to transceive information with communication device 102 and other communication devices via network 105. The other communication devices may be communicatively coupled to communication device 104, wirelessly or via a wired connection, via network 105 so that the other communication devices remain discoverable to communication device 104. A real time communication data stream may be established between communication device 102 and communication device 104 over network 103. Communication device 104 may be configured to discover the other communication devices, e.g., desktop computer 106, wireless communication device 108, laptop computer 110, etc., within threshold distance 112. The identification information corresponding to the other communication devices may be stored in communication device 104. When unexpected technical difficulties occur, such as a battery power of communication device 104 falls below a preset threshold value or a processor of communication device 104 fails to process data stored on communication device 104, communication device 104 may be configured to transfer the aforementioned information exchange, e.g., the real time communication data stream, to one of the other communication devices. That is, communication device 104 may be configured to relay the real time communication data stream between communication device 102 and one of the other communication devices. In some examples, during relaying the real time communication data stream, components other than a network adapter, such as display module, web camera, speakers, may not be functioning and, thus, may be turned off to save energy. A user of communication device 104 may start to utilize one of the other communication devices to continue the communication with communication device 102 without interrupting the real time communication data stream.

Network 105 may refer to a communication link that may be configured to support the information exchange between communication device 104 and other communication devices, e.g., desktop computer 106, wireless communication device 108, laptop computer 110, etc., within threshold distance 112. Network 105 may be established based on various communication techniques, wireless or via a wired connection, that include Wireless Fidelity (Wi-Fi), Bluetooth, local area network, Near Field Communication (NFC), Radio Frequency Identification (RFID), electromagnetic waves, etc.

Desktop computer 106 may refer to a computer in a form intended for regular use at a single location. Desktop computer 106 may be configured to be communicatively coupled to communication device 104 via network 105. In some examples, when communication device 104 experiences technical difficulties and may not be suitable for processing the real time communication data stream, desktop computer 106 may be configured to process the communication data stream. For example, when a user on communication device 102 is conducting a video conference with another user on communication device 104, communication device 104 may transfer the processing of the video conference to desktop computer 106 if the battery power of communication device 104 falls below a preset threshold value, or the processor of communication device 104 fails to process data. That is, the user on communication device 104 may utilize the input and output devices, e.g., video camera, microphone, speaker, etc., of desktop computer 106 to continue the video conference.

Wireless communication device 108 may refer to a physical device that may be configured to exchange information with communication device 104 wirelessly. Wireless communication device 108 may be implemented as telephones, cellphones, smart phones, personal digital assistant (PDA), or other forms of portable two-way radio transceivers. When communication device 104 experiences technical difficulties and may not be suitable for processing the real time communication data stream, wireless communication device 108 may be configured to process the real time communication data stream initiated between communication device 102 and communication device 104. For example, when the user on communication device 104, e.g., a cellphone, is making phone call with another user on communication device 102, e.g., another cellphone, and the battery of communication device 104 falls below a preset threshold value, or the processor of communication device 104 fails to process data, communication device 104 may transfer the processing of the data stream of the phone call to wireless communication device 108. That is, the user may utilize wireless communication device 108 to continue the phone call without interrupting the real time communication data stream.

Laptop computer 110 may refer to a portable computer that may be configured to exchange information with communication device 104 via network 105. Laptop computer 110 may include hardware components, such as web camera, microphone, speakers, integrated thereon so that the user of communication device 104 may utilize laptop computer 110 when communication device 104 is not suitable to continue processing the communication data stream between communication device 102 and communication device 104.

Threshold distance 112 may refer to a distance preset by communication device 104 so that communication devices within threshold distance 112 may establish a stable and robust connection with communication device 104.

Thus, FIG. 1 shows an example system 100 that may include communication device 102 that communicates, via network 103, with communication device 104 that may be configured to relay the communication to, via network 105, desktop computer 106, wireless communication device 108, or laptop computer 110.

Figure 2:
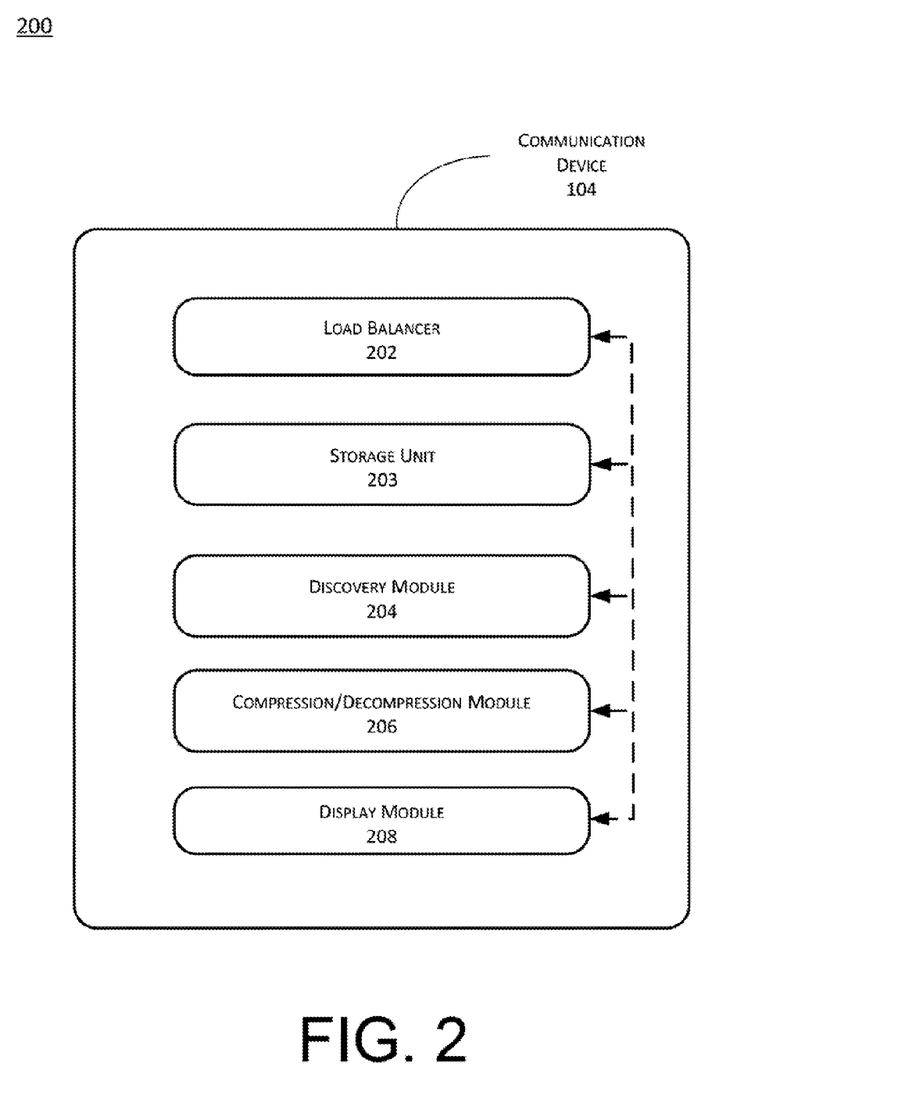
FIG. 2 shows an example communication device by which data relay between communication devices may be implemented, arranged in accordance with at least some embodiments described herein.

FIG. 2 shows an example communication device 104 by which data relay between communication devices may be implemented, arranged in accordance with at least some embodiments described herein. As depicted, example communication device 104 may include a load balancer 202, a storage unit 203, a discovery module 204, a compression/decompression module 206, and a display module 208, each of which may be configured to interact with each other.

Load balancer 202 may refer to a software component, a hardware component, a firmware component, or a combination thereof that may be configured to transfer a real time communication data stream between communication device 102 and communication device 104 to other communication devices in accordance with at least one of a plurality of predetermined conditions that indicate unexpected technical difficulties. The plurality of predetermined conditions may include at least one of a battery power of communication device 104 falling below a preset threshold value, a processor of communication device 104 failing to process data stored thereon, a web camera of communication device 104 failing to capture images, etc. In accordance with some examples, load balancer 202 may select one from other communication devices discovered by discovery module 204. For example, when certain technical difficulties occur during a video conference between communication device 102 and communication device 104, e.g., the microphone of communication device 104 stops working, load balancer 202 may select a communication device with a working microphone from the communication devices discovered by discovery module 204 and transfer, or relay, the real time communication data stream of the video conference to the selected communication device so that the user may continue the video conference without interruption.

Storage unit 203 may refer to a hardware component that may be configured to store identification information of the discovered communication devices. Storage unit 203 may be implemented as random access memory (RAM), hard disk, solid state drive (SSD), etc.

Discovery module 204 may refer to a software component, a hardware component, a firmware component, or a combination thereof that may be configured to discover other communication devices within threshold distance 112 of communication device 104. In accordance with some examples, discovery module 204 may be configured to discover laptop computers connected to communication device 104 via a Wi-Fi network, desktop computers connected to communication device 104 via a local area network, or a cellphone connected to communication device 104 via a Bluetooth connection within threshold distance 112 of communication device 104. The identification information of the communication devices may be submitted to storage unit 203 and stored thereon.

Compression/decompression module 206 may refer to a software component, a hardware component, a firmware component, or a combination thereof that may be configured to compress raw data collected by input devices of communication device 104 into one or more transferrable data packets and decompress one or more data packets received from communication device 102 to raw data that may be processed by communication device 104.

Display module 208 may refer to a hardware component that may be configured to display contents received from communication device 102 or generated on communication device 104. For example, display module 208 may be configured to display a video stream of a video conference or an interface of a cellphone. In accordance with some examples, when communication device 104 transfers the real time communication data stream to one of other communication devices, compression/decompression module 206, display module 208, and other components, e.g., web camera, microphone, etc., may not be necessary for transferring. Thus, compression/decompression module 206, display module 208, and other components may be turned off to save power.

Thus, FIG. 2 shows an example communication device 104 that may include load balancer 202, storage unit 203, discovery module 204, compression/decompression module 206, and display module 208.

Figure 3:
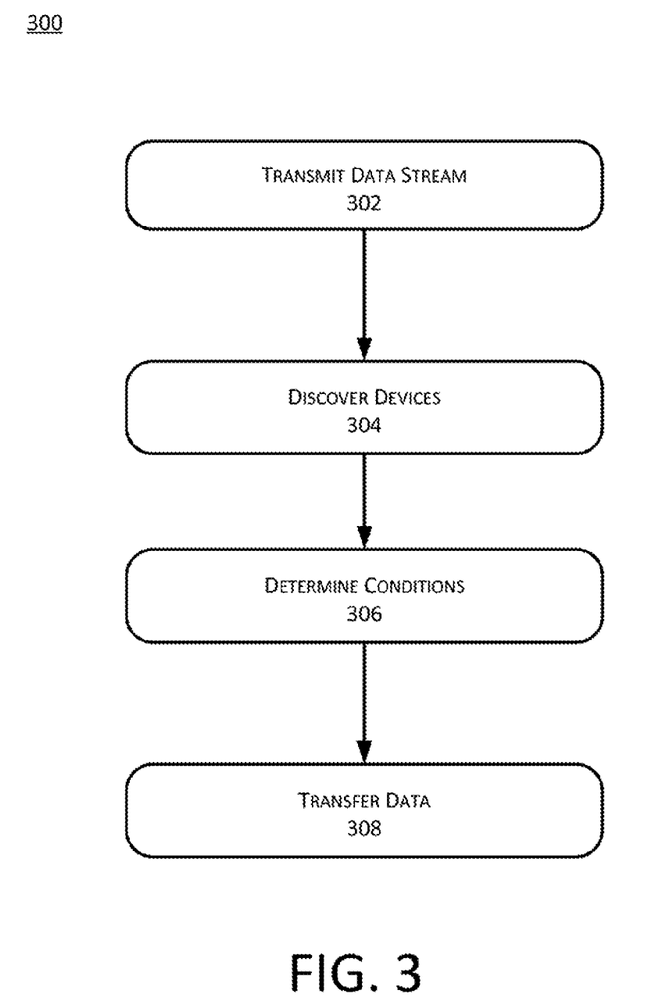
FIG. 3 shows an example configuration of a processing flow of operations by which data relay between communication devices may be implemented, arranged in accordance with at least some embodiments described herein.

FIG. 3 shows an example configuration of a processing flow 300 of operations by which data relay between communication devices may be implemented, arranged in accordance with at least some embodiments described herein. As depicted, processing flow 300 may include sub-processes executed by various components that are part of example systems 100. However, processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 300 may include various operation, functions, or actions as illustrated by one or more of blocks 302, 304, 306, and 308. Processing may begin at block 302.

Block 302 (Transmit Data Stream) may refer to communication device 104 transmitting a communication data stream between communication device 102 and communication device 104. In some examples, the communication data stream may be established and maintained via a service provider such as a server over a network or a cell in a cellular network. The communication data stream may include a real time video conference, a phone call, etc. Processing may continue from block 302 to block 304.

Block 304 (Discover Devices) may refer to discovery module 204 of communication device 104 discovering one or more communication devices within a predetermined distance, e.g., threshold distance 112, of communication device 104. The one or more communication devices may be communicatively coupled to communication device 104 in accordance with one or more communication protocols that include Bluetooth, NFC, RFID, Wi-Fi, etc. The method to discover the one or more communication devices may vary depending on the type of the communication protocols. For example, in discovering the one or more communication devices coupled to communication device 104 via a Bluetooth connection, communication device 104 may adopt Service Discovery Protocols (SDP) that allows communication device 104 to discover the services that the one or more communication devices support and the parameters to use to connect to the one or more communication devices. Identification information of the one or more communication devices may be stored in storage unit 203. Processing may continue from block 304 to block 306.

Block 306 (Determine Conditions) may refer to load balancer 202 determining that at least one of a plurality of predetermined conditions is met. The plurality of predetermined conditions may include a battery power of communication device 104 falling below a preset threshold value, a processor of communication device 104 failing to process data stored on communication device 104, a web camera of communication device 104 failing to capture pictures, etc. Processing may continue from block 306 to block 308.

Block 308 (Transfer Data) may refer to load balancer 202 transferring, i.e., relaying, the communication data stream to one of the one or more discovered communication devices. When one of the aforementioned plurality of predetermined conditions is met, load balancer 202 may be configured to select one from the discovered communication devices and one protocol from a plurality of protocols based on a distance from communication device 104 to the selected communication device to transfer the communication data stream. For example, if the selected communication device is located within 10 meters, load balancer 202 may be configured to select Bluetooth as the protocol in transferring the communication data stream. In some examples, a user of communication device 104 may pre-select, or designate, one from discovered communication device before one of the plurality of predetermined conditions is met. For example, a user of communication device 104, e.g., a first cellphone, may pre-select a second cellphone as a backup communication device since the user may foresee the battery power of the first cellphone may not last long enough for the phone call. When the battery power of the first cellphone drops below a predetermined threshold value, the first cellphone may start to transfer the phone call to the second cellphone. Meanwhile, all other components unnecessary for maintaining the phone call may be turned off. For example, compression/decompression module 206 and display module 208 may be turned off to save power.

Thus, FIG. 3 shows an example configuration of a processing flow 300 of operations including transmitting a communication data stream between a service provider and communication device 104, discovering one or more communication devices within a predetermined distance of communication device 104, determining that at least one of a plurality of predetermined conditions is met, and transferring the communication data stream to the second communication device, which is one of the discovered communication devices.

Figure 4:
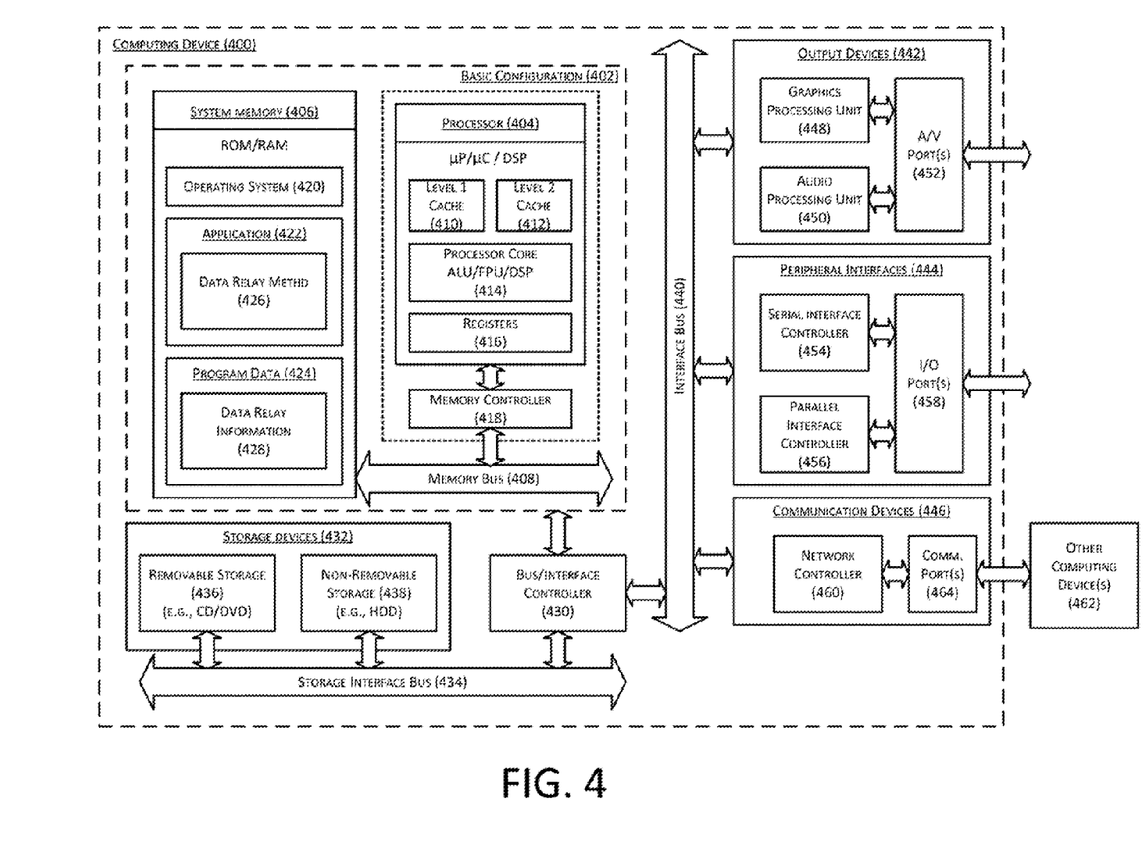
FIG. 4 shows a block diagram illustrating an example computing device that is arranged for data relay between communication devices, arranged in accordance with at least some embodiments described herein.

FIG. 4 shows a block diagram illustrating an example computing device that is arranged for data relay between communication devices, arranged in accordance with at least some embodiments described herein.

FIG. 4 is a block diagram illustrating an example computing device 400 that is arranged for data relay in accordance with the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a data relay method 426 that is arranged to perform the operations as described herein including those described with respect to processing flow 300 of FIG. 3. Program data 424 may include data relay information 428 that may be useful for configuring data relay algorithm as is described herein. In some embodiments, application 422 may be arranged to operate with program data 424 on operating system 420 such that implementations of data relay communication devices may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

We claim:

1. A first wireless communication device, comprising:
    a discovery module configured to discover one or more other wireless communication devices proximate to the first wireless communication device;
    a load balancer configured to:
        select a second wireless communication device from the discovered one or more other wireless communication devices after the load balancer determines that one or more specific conditions are met, wherein the one or more specific conditions include a battery condition that a battery power of the first wireless communication device falls below a particular threshold and a user interface condition that a user interface of the first wireless communication device fails to process data associated with a wireless communication data stream between a service provider and the first wireless communication device, and wherein the second wireless communication device is different from the first wireless communication device;
        transfer the wireless communication data stream to the second wireless communication device, in-response to at least one of the one or more specific conditions being met; and
        turn off components, of the first wireless communication device, which are not required for the transfer of the wireless communication data stream when the one or more specific conditions being met is the battery condition, wherein the components of the first wireless communication device are turned off while the wireless communication data stream is transferred to the second wireless communication device; and
    a storage unit configured to store identification information that corresponds to the second wireless communication device,
    wherein the selection of the second wireless communication device is based on a state of a user interface of the second wireless communication device when the one or more specific conditions being met is the user interface condition, wherein the state is a working state, and wherein the user interface of the second wireless device corresponds to the user interface of the first wireless communication device.

2. The first wireless communication device of claim 1, wherein the load balancer is configured to transfer the wireless communication data stream in accordance with one of a plurality of wireless communication protocols based on a distance between the first wireless communication device and the second wireless communication device.

3. The first wireless communication device of claim 2, wherein the plurality of wireless communication protocols include near field communication (NFC), radio frequency identification (RFID), and wireless fidelity (Wi-Fi).

4. A method, comprising:
    transmitting a wireless communication data stream between a service provider and a first wireless communication device;
    discovering one or more other wireless communication devices proximate to the first wireless communication device;
    determining that at least one of a plurality of specific conditions is met, wherein the at least one of the plurality of specific conditions includes a battery condition that a battery power of the first wireless communication device falls below a particular threshold and a user interface condition that a user interface component of the first wireless communication device fails to process data associated with the wireless communication data stream; and
    based on the determination that the at least one of the plurality of specific conditions is met:
        selecting a second wireless communication device from the discovered one or more other wireless communication devices proximate to the first wireless communication device, wherein the selection of the second wireless communication device is based on a state of a user interface component of the second wireless communication device when the at least one of the plurality of specific conditions being met is the user interface condition, wherein the state of the user interface component of the second wireless communication device indicates that the user interface component of the second wireless communication device is in a working state, and wherein the user interface component of the second wireless communication device corresponds to the user interface component of the first wireless communication device;
        transferring the wireless communication data stream to the second wireless communication device; and
        turning off components, of the first wireless communication device, which are not required for the transfer of the wireless communication data stream when the at least one of the plurality of specific conditions being met is the battery condition, wherein the components of the first wireless communication device are turned off while the wireless communication data stream is transferred to the second wireless communication device.

5. The method of claim 4, wherein the transferring comprises selecting one protocol from a plurality of wireless communication protocols based on a distance from the first wireless communication device to the second wireless communication device.

6. The method of claim 5, wherein the selecting one protocol from the plurality of wireless communication protocols comprises selecting one protocol from the plurality of wireless communication protocols that include (NFC), radio frequency identification (RFID), and wireless fidelity (Wi-Fi).

7. A non-transitory computer-readable medium having instructions stored thereon that, in response to execution, cause a first wireless communication device to perform or control performance of operations to:

discover one or more other wireless communication devices proximate to the first wireless communication device;

determine that at least one of a plurality of specific conditions is met, wherein the at least one of the plurality of specific conditions includes a battery condition that a battery power of the first wireless communication device falls below a particular threshold and a user interface condition that a user interface component of the first wireless communication device fails to process data associated with a wireless communication data stream between the first wireless communication device and a calling party;

select a second wireless communication device from the discovered one or more other wireless communication devices proximate to the first wireless communication device after at least one of the plurality of specific conditions is met, wherein the selection of the second wireless communication device is based on a state of a user interface component of the second wireless communication device when the at least one of the plurality of specific conditions being met is the user interface condition, wherein the state of the user interface component indicates that the user interface component of the second wireless communication device is in a working state, wherein the user interface component of the second wireless communication device corresponds to the user interface component of the first wireless communication device, and wherein the second wireless communication device is different from the first wireless communication device;

relay the wireless communication data stream to the second wireless communication device; and turn off components, of the first wireless communication device, which are not required for the relay of the wireless communication data stream when the at least one of the plurality of specific conditions being met is the battery condition, wherein the components of the first wireless communication device are turned off while the wireless communication data stream is relayed to the second wireless communication device.

8. The computer-readable medium of claim 7, wherein the operation to relay comprises an operation to select one wireless communication protocol from a plurality of wireless communication protocols based on a distance between the first wireless communication device and the second wireless communication device.

9. The computer-readable medium of claim 8, wherein the operation to select the one wireless communication protocol from the plurality of wireless communication protocols comprises an operation to select the one wireless communication protocol from the plurality of wireless communication protocols that include near field communication (NFC), radio frequency identification (RFID), and wireless fidelity (Wi-Fi).

10. A system, comprising:
a first wireless communication device in communication with a calling party; and
a second wireless communication device selected from discovered one or more other wireless communication devices, wherein the second wireless communication device is different from the first wireless communication device,
wherein the first wireless communication device comprises:

a discovery module configured to discover the one or more other wireless communication devices proximate to the first wireless communication device; and
a load balancer configured to:
select the second wireless communication device from the discovered one or more other wireless communication devices after the load balancer determines that one or more specific conditions is met;
transfer a wireless communication data stream between the first wireless communication device and the calling party to the second wireless communication device, after at least one of the one or more specific conditions is met,
wherein the one or more specific conditions include a battery condition that a battery power of the first wireless communication device falls below a particular threshold and a user interface condition that a user interface of the first wireless communication device fails to process data associated with the wireless communication data stream; and
turn off components, of the first wireless communication device, which are not required for the transfer of the wireless communication data stream when the one or more specific conditions being met is the battery condition, wherein the components of the first wireless communication device are being turned off while the wireless communication data stream is transferred to the second wireless communication device,
wherein the selection of the second wireless communication device is based on a state of a user interface of the second wireless communication device when the one or more specific conditions being met is the user interface condition, wherein the state is a working state, and wherein the user interface of the second wireless device corresponds to the user interface of the first wireless communication device.

11. The first wireless communication device of claim 1, wherein the turned off components of the first wireless communication device include one or more of a web camera, a microphone, a compression/decompression module, and a display module.

12. The method of claim 4, wherein the user interface component of the first wireless communication device includes one of a web camera of the first wireless communication device and a microphone of the first wireless communication device, and wherein the user interface component of the second wireless communication device includes one of a web camera of the second wireless communication device and a microphone of the second wireless communication device.

13. The non-transitory computer readable medium of claim 7, wherein the user interface component of the first wireless communication device includes one of a web camera of the first wireless communication device and a microphone of the first wireless communication device, and wherein the user interface component of the second wireless communication device includes one of a web camera of the second wireless communication device and a microphone of the second wireless communication device.

14. The system of claim 10, wherein the turned off components of the first wireless communication device includes one or more of a web camera, a microphone, a compression/decompression module, and a display module.

* * * * *

UNITED STATES PATENT AND TRADEMARK OFFICE
CERTIFICATE OF CORRECTION

PATENT NO. : 9,936,459 B2
APPLICATION NO. : 14/438522
DATED : April 3, 2018
INVENTOR(S) : Zhang et al.

It is certified that error appears in the above-identified patent and that said Letters Patent is hereby corrected as shown below:

On the Title Page

In Item (71), under "Applicant", in Column 1, Lines 1-5, delete "EMPIRE TECHNOLOGY DEVELOPMENT LLC, Wilmington, DE (US); Junhua Zhang, Beijing (CN); Qi Li; Beijing (CN); Xuefeng Song, Hebei (CN)" and insert -- EMPIRE TECHNOLOGY DEVELOPMENT LLC, Wilmington, DE (US)" --, therefor.

In the Drawings

In Fig. 4, Sheet 4 of 4, for Tag "(426)" Lines 1-2, delete "Data Relay Methd (426)" and insert -- Data Relay Method (426) --, therefor. (See Attached Sheet)

In the Specification

In Column 1, Lines 9-10, delete "Iternational" and insert -- International --, therefor.

In Column 5, Line 37, delete "hard disk," and insert -- hard disk drive (HDD), --, therefor.

In Column 7, Line 51, delete "one more" and insert -- one or more --, therefor.

In Column 7, Lines 57-58, delete "implementations memory" and insert -- implementations, memory --, therefor.

In the Claims

In Column 10, Line 61, in Claim 6, delete "include (NFC)," and insert -- include near field communication (NFC), --, therefor.

Signed and Sealed this
Twenty-ninth Day of May, 2018

Andrei Iancu
*Director of the United States Patent and Trademark Office*

CERTIFICATE OF CORRECTION (continued)
U.S. Pat. No. 9,936,459 B2

In Column 11, Line 44, in Claim 8, delete "The computer-readable medium" and insert -- The non-transistory computer-readable medium --, therefor.

In Column 11, Line 50, in Claim 9, delete "The computer-readable medium" and insert -- The non-transistory computer-readable medium --, therefor.

FIG. 4